US012593306B2

(12) United States Patent
Li et al.

(10) Patent No.: US 12,593,306 B2
(45) Date of Patent: Mar. 31, 2026

(54) METHOD AND DEVICE FOR POSITIONING TERMINAL

(71) Applicant: DATANG MOBILE COMMUNICATIONS EQUIPMENT CO., LTD., Beijing (CN)

(72) Inventors: Hui Li, Beijing (CN); Bin Ren, Beijing (CN); Xiaotao Ren, Beijing (CN); Ren Da, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 315 days.

(21) Appl. No.: 18/261,828

(22) PCT Filed: Jan. 13, 2022

(86) PCT No.: PCT/CN2022/071807
§ 371 (c)(1),
(2) Date: Jul. 17, 2023

(87) PCT Pub. No.: WO2022/152211
PCT Pub. Date: Jul. 21, 2022

(65) Prior Publication Data
US 2024/0080797 A1 Mar. 7, 2024

(30) Foreign Application Priority Data
Jan. 18, 2021 (CN) .......................... 202110062702.2

(51) Int. Cl.
*H04W 64/00* (2009.01)
*H04L 5/00* (2006.01)
*H04W 24/10* (2009.01)

(52) U.S. Cl.
CPC .......... *H04W 64/006* (2013.01); *H04L 5/0035* (2013.01); *H04L 5/0051* (2013.01); *H04W 24/10* (2013.01)

(58) Field of Classification Search
CPC ........ G01S 5/0009; G01S 5/0036; G01S 5/02; G01S 5/0218; G01S 5/0236;
(Continued)

(56) References Cited

U.S. PATENT DOCUMENTS 11,201,715 B2 * 12/2021 Da ........................ H04W 24/08
11,510,174 B2 * 11/2022 Cha ....................... H04L 5/0091
(Continued)

FOREIGN PATENT DOCUMENTS

CN        111182579 A        5/2020
CN        111278023 A        6/2020
(Continued)

OTHER PUBLICATIONS

Sosnin et al., DL-AOD Positioning Algorithm for Enhanced 5G NR Location Services, IEEE, 7 pages, Nov. 29 to Dec. 2, 2021.*
(Continued)

*Primary Examiner* — Frank Duong
(74) *Attorney, Agent, or Firm* — Ladas & Parry, LLP

(57) ABSTRACT
A method and a device for positioning a terminal are provided. The method includes: measuring, by the terminal, a downlink positioning reference signal of a TRP, to obtain a measurement result for the downlink positioning reference signal, where at least one downlink positioning reference signal is measured by using at least two reception beams to obtain at least two measurement results; and transmitting, by the terminal, the measurement result for the downlink positioning reference signal of the TRP to a network.

16 Claims, 3 Drawing Sheets

Measuring, by the terminal, a downlink positioning reference signal of a TRP, to obtain a measurement result for the downlink positioning reference signal, where at least one downlink positioning reference signal is measured by using at least two reception beams to obtain at least two measurement results ⟍ 21

Transmitting, by the terminal, the measurement result for the downlink positioning reference signal of the TRP to a network ⟍ 22

(58) Field of Classification Search
CPC ....... G01S 5/0295; G01S 5/10; H04L 5/0035; H04L 5/0051; H04W 24/08; H04W 24/10; H04W 64/00; H04W 64/006
See application file for complete search history.

(56) References Cited

U.S. PATENT DOCUMENTS

| | | | |
|---|---|---|---|
| 11,979,794 B2 * | 5/2024 | Khoryaev ............. | H04W 24/10 |
| 12,284,131 B2 * | 4/2025 | Si ......................... | H04B 7/0632 |
| 12,289,706 B2 * | 4/2025 | Wang .................... | H04L 5/0094 |
| 2019/0369201 A1 * | 12/2019 | Akkarakaran ........ | G01S 5/0236 |
| 2021/0297886 A1 | 9/2021 | Chen et al. | |
| 2021/0306895 A1 * | 9/2021 | Chen ..................... | G01S 5/0236 |
| 2021/0376940 A1 | 12/2021 | Huang et al. | |
| 2022/0014335 A1 | 1/2022 | Si et al. | |
| 2022/0015060 A1 | 1/2022 | Wang et al. | |
| 2022/0322105 A1 | 10/2022 | Ren et al. | |

FOREIGN PATENT DOCUMENTS

| | | | |
|---|---|---|---|
| CN | 111314952 | A | 6/2020 |
| WO | 2020119727 | A1 | 6/2020 |
| WO | 2020164517 | A1 | 8/2020 |
| WO | 2020192341 | A1 | 10/2020 |
| WO | 2020220803 | A1 | 11/2020 |

OTHER PUBLICATIONS

International Search Report for PCT Application No. PCT/CN2022/071807 issued on Apr. 13, 2022 and its English Translation provided by WIPO.

Written Opinion for PCT Application No. PCT/CN2022/071807 issued on Apr. 13, 2022 and its English Translation provided by WIPO.

International Preliminary Report on Patentability for PCT Application No. PCT/CN2022/071807 issued on Jul. 4, 2023 and its English Translation provided by WIPO.

Supplementary European Search Report in EP patent Application No. 22739087.9, issued on Jun. 21, 2024.

* cited by examiner

Receiving, by a network side device, measurement results for downlink positioning reference signals of multiple TRPs transmitted by a terminal, where at least one downlink positioning reference signal has two measurement results corresponding to at least two reception beams of the terminal respectively — 31

Performing, by the network side device, terminal positioning based on the measurement results for the downlink positioning reference signals of the multiple TRPs — 32

FIG. 3

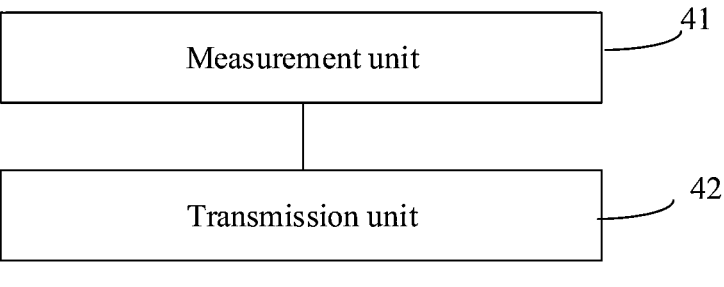

Measurement unit — 41

Transmission unit — 42

FIG. 4

METHOD AND DEVICE FOR POSITIONING TERMINAL

CROSS-REFERENCE TO RELATED APPLICATIONS

This application is the U.S. national phase of PCT International Application No. PCT/CN2022/071807 filed on Jan. 13, 2022, which claims a priority to Chinese Patent Application No. 202110062702.2 filed in China on Jan. 18, 2021, the disclosures of which is are incorporated hereby by reference in their entireties.

TECHNICAL FIELD

The present disclosure relates to the technical field of mobile communications, and in particular, to a method and a device for positioning a terminal.

BACKGROUND

In a fifth-generation (5th-generation, 5G) new radio (New Radio, NR) mobile communications system, each transmission and reception point (Transmission and Reception Point, TRP) may send multiple downlink positioning reference signals (Positioning Reference Signals, PRS), and the multiple downlink positioning reference signals point to different directions after beamforming. A terminal measures a reference signal received power (Reference Signal Received Power, RSRP) of each beam, and feeds back a measurement value of the RSRP of the each beam to a positioning server. The positioning server determines an angle of departure (Angle of Departure, AOD) from a corresponding TRP to the terminal, and then determines position information of the terminal.

FIG. 1 shows principles for measuring a downlink angle of departure (Downlink Angle of Departure, DL-AoD). A terminal 4 measures multiple transmission beams from a TRP1, a TRP2 and a TRP3. For example, the terminal has reception beams 21 and 22, and each of the TRPs has transmission beams 11, 12 and 13. For the TRP1, the terminal determines the reception beam 21, and after the terminal measures the three transmission beams 11, 12 and 13 of the TRP1 based on a direction of the reception beam 21, the terminal feeds back a reference signal received power (Reference Signal Received Power, RSRP) corresponding to each transmission beam and feeds back the reception beam. Based on the RSRPs of the three beams, and transmission angles corresponding to the three transmission beams known to the server, the positioning server may obtain an angle of arrival from the TRP1 to the terminal 4 through interpolation. Similarly, same operations may be performed for the TRP2 and the TRP3. In this way, after obtaining angles of arrival from multiple TRPs to the terminal, the positioning server may obtain position information of the terminal through calculation with a conventional angle-based algorithm.

Positioning accuracy needs to be further improved for the current method of positioning a terminal. Therefore, there is an urgent need for a terminal positioning having an improved accuracy.

SUMMARY

At least one embodiment of the present disclosure provides a method and a device for positioning terminals, which can improve the accuracy of positioning terminals.

According to an aspect of the present disclosure, at least one embodiment provides a method of positioning a terminal, including:

measuring, by the terminal, a downlink positioning reference signal of a transmission and reception point (TRP), to obtain a measurement result for the downlink positioning reference signal, where at least one downlink positioning reference signal is measured by using at least two reception beams to obtain at least two measurement results; and transmitting, by the terminal, the measurement result for the downlink positioning reference signal of the TRP to a network.

In addition, according to at least one embodiment of the present disclosure, before the measuring the downlink positioning reference signal of the TRP, the method further includes:

receiving positioning measurement configuration information sent by the network, where the positioning measurement configuration information includes configuration information on T TRPs and on multiple downlink positioning reference signals of each TRP; and determining, based on the positioning measurement configuration information and/or a terminal measurement capability, the quantity of measurement results for each downlink positioning reference signal of each TRP, where different measurement results correspond to different reception beams of the terminal, respectively, and at least one downlink positioning reference signal has at least two measurement results.

In addition, according to at least one embodiment of the present disclosure, the terminal measurement capability includes at least one of the following:

the terminal supports reporting a maximum of P measurement results for a same downlink positioning reference signal;

the terminal supports reporting a maximum of Q measurement results for multiple downlink positioning reference signals of a same TRP; or, the terminal supports reporting a maximum of R measurement results for multiple downlink positioning reference signals of multiple TRPs.

In addition, according to at least one embodiment of the present disclosure, the determining, based on the positioning measurement configuration information and/or the terminal measurement capability, the quantity of measurement results for the each downlink positioning reference signal of the each TRP includes:

in a case that downlink positioning reference signals configured by the positioning measurement configuration information are beyond the terminal measurement capability, determining the quantity of measurement results for each downlink positioning reference signal of each TRP based on the following items with a priority order in the sequence listed: the quantity of TRPs to be measured; the quantity of downlink positioning reference signals to be measured; the quantity of measurement results for one downlink positioning reference signal at multiple reception beams.

In addition, according to at least one embodiment of the present disclosure, the measurement result for the downlink positioning reference signal includes:

a received quality measurement value of the downlink positioning reference signal and corresponding reception beam indication information.

In addition, according to at least one embodiment of the present disclosure, the reception beam indication information includes one or more of the following: a beam index of a reception beam, beam response information of the reception beam, a beam feature of the reception beam, or a beamforming weight of the reception beam.

In addition, according to at least one embodiment of the present disclosure, the measurement result for the downlink positioning reference signal further includes:

line-of-sight/non-line-of-sight indication information corresponding to the received quality measurement value of the downlink positioning reference signal.

In addition, according to at least one embodiment of the present disclosure, the line-of-sight/non-line-of-sight indication information includes one or more of the following: a line of sight, a non-line of sight, a probability for line of sight, a probability for non-line of sight, a probability distribution curve of a line of sight, or a probability distribution curve of a non-line of sight.

In addition, according to at least one embodiment of the present disclosure, the positioning measurement configuration information is further used to indicate reporting a processing result corresponding to line of sight only; and the measurement results for the downlink positioning reference signal of the TRP transmitted by the terminal, corresponds to the line of sight.

In addition, according to at least one embodiment of the present disclosure, the method further includes:

transmitting quantity information of reception beams supported by the terminal to the network.

According to another aspect of the present disclosure, at least one embodiment provides a method of positioning a terminal, including:

receiving, by a network side device, measurement results for downlink positioning reference signals of multiple transmission and reception points (TRP) transmitted by the terminal, where at least one downlink positioning reference signal has two measurement results corresponding to at least two reception beams of the terminal respectively; and performing, by the network side device, terminal positioning based on the measurement results for the downlink positioning reference signals of the multiple TRPs.

In addition, according to at least one embodiment of the present disclosure, the method further includes:

transmitting positioning measurement configuration information to the terminal, where the positioning measurement configuration information includes configuration information on T TRPs and on multiple downlink positioning reference signals of each TRP.

In addition, according to at least one embodiment of the present disclosure, the method further includes:

receiving quantity information of reception beams supported by the terminal that is sent by the terminal; and determining the positioning measurement configuration information based on the quantity information of reception beams supported by the terminal.

In addition, according to at least one embodiment of the present disclosure, the measurement result for the downlink positioning reference signal includes:

a received quality measurement value of the downlink positioning reference signal and corresponding reception beam indication information.

In addition, according to at least one embodiment of the present disclosure, the reception beam indication information includes one or more of the following: a beam index of a reception beam, beam response information of the reception beam, a beam feature of the reception beam, or a beamforming weight of the reception beam.

In addition, according to at least one embodiment of the present disclosure, the measurement result for the downlink positioning reference signal further includes:

line-of-sight/non-line-of-sight indication information corresponding to the received quality measurement value of the downlink positioning reference signal.

In addition, according to at least one embodiment of the present disclosure, the line-of-sight/non-line-of-sight indication information includes one or more of the following: a line of sight, a non-line of sight, a probability for line of sight, a probability for non-line of sight, a probability distribution curve of line of sight, or a probability distribution curve of non-line of sight.

In addition, according to at least one embodiment of the present disclosure, the performing terminal positioning based on the measurement results for downlink positioning reference signals of the multiple TRPs includes:

in a case that a same downlink positioning reference signal has multiple measurement results, selecting a first measurement result from the multiple measurement results, where the first measurement result has a maximum probability for belonging to a line of sight; and performing the terminal positioning based on the first measurement result.

According to another aspect of the present disclosure, at least one embodiment provides a terminal, including a memory, a transceiver, and a processor, the memory is configured to store a computer program;

the transceiver is configured to send and receive data under control of the processor; and the processor is configured to read the computer program in the memory to perform following operations:

measuring a downlink positioning reference signal of a transmission and reception point (TRP), to obtain a measurement result for the downlink positioning reference signal, where at least one downlink positioning reference signal is measured by using at least two reception beams to obtain at least two measurement results; and transmitting the measurement result for the downlink positioning reference signal of the TRP to a network.

According to another aspect of the present disclosure, at least one embodiment provides a terminal, including:

a measurement unit, configured to measure a downlink positioning reference signal of a transmission and reception point (TRP), to obtain a measurement result for the downlink positioning reference signal, where at least one downlink positioning reference signal is measured by using at least two reception beams to obtain at least two measurement results; and a transmission unit, configured to transmit the measurement result for the downlink positioning reference signal of the TRP to a network.

According to another aspect of the present disclosure, at least one embodiment provides a network side device, including a memory, a transceiver, and a processor, the memory is configured to store a computer program;

the transceiver is configured to send and receive data under control of the processor; and the processor is configured to read the computer program in the memory to perform following operations:

receiving measurement results for downlink positioning reference signals of multiple transmission and reception points (TRP) transmitted by a terminal, where at least one downlink positioning reference signal has two measurement results corresponding to at least two reception beams of the terminal respectively; and performing terminal positioning based on the measurement results for the downlink positioning reference signals of the multiple TRPs.

According to another aspect of the present disclosure, at least one embodiment provides a network side device, including:

a reception unit, configured to receive measurement results for downlink positioning reference signals of multiple transmission and reception points (TRP) transmitted by a terminal, where at least one downlink positioning reference signal has two measurement results corresponding to at least two reception beams of the terminal respectively; and a positioning unit, configured to perform terminal positioning based on the measurement results for the downlink positioning reference signals of the multiple TRPs.

According to another aspect of the present disclosure, at least one embodiment provides a processor readable storage medium, where the processor readable storage medium stores a computer program, and the computer program is used to enable the processor to perform the method as described above.

In the method and the device for positioning the terminal according to the embodiments of the present disclosure, the terminal can send the measurement results for the downlink positioning reference signal, which are obtained through measuring based on at least two reception beams, to the network side as compared with related technologies, so that the network side may obtain multiple measurement results for the same transmission beam, which facilitates improving the accuracy of terminal positioning performed based on these measurement results.

BRIEF DESCRIPTION OF THE DRAWINGS

FIG. 3 is another schematic flowchart of a method of positioning a terminal according to embodiments of the present disclosure;

FIG. 4 is a schematic structural diagram of a terminal according to embodiments of the present disclosure;

DETAILED DESCRIPTION

Figure 1:
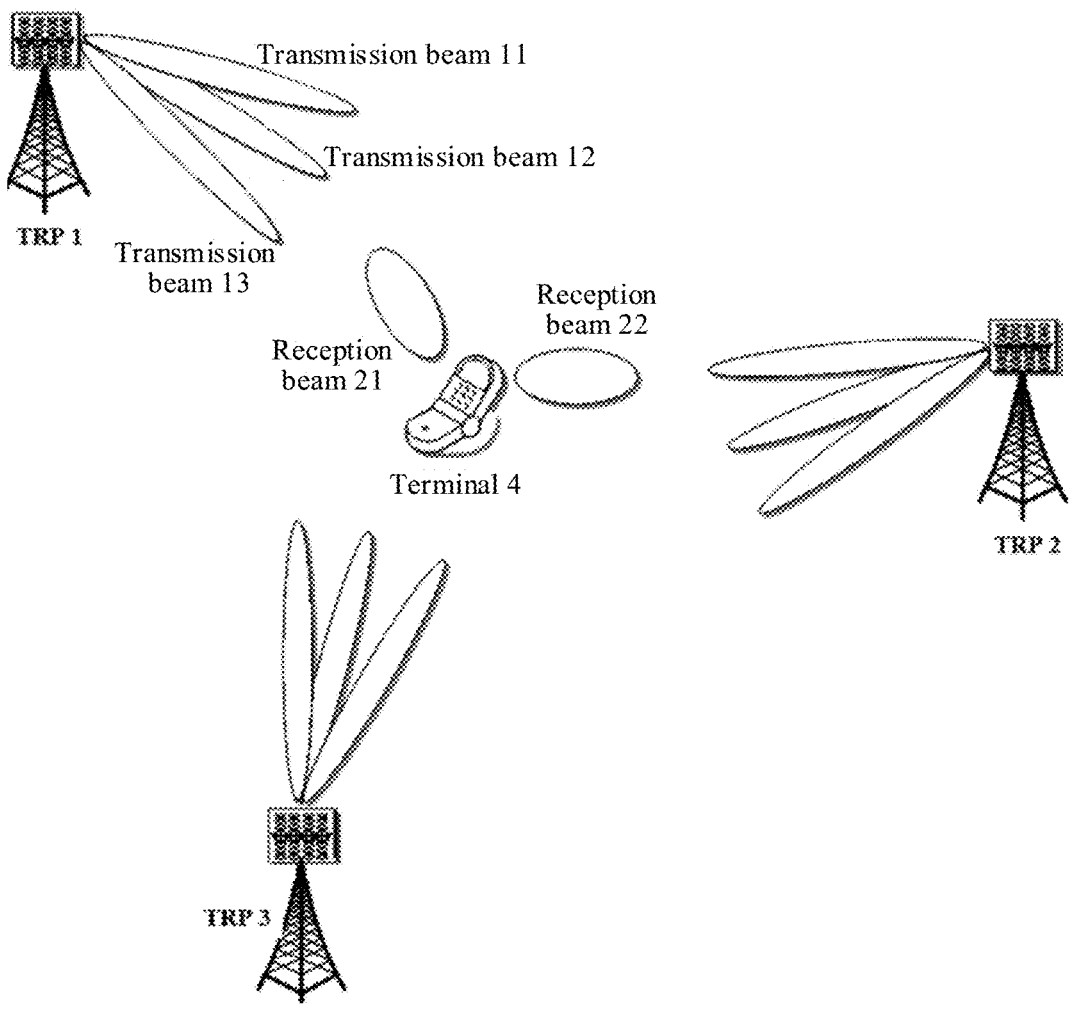
FIG. 1 is a schematic diagram of a positioning method based on a downlink angle of departure in the related technologies.

Exemplary embodiments of the present disclosure are described in more detail with reference to the accompanying drawings hereinafter. Although the drawings show exemplary embodiments of the present disclosure, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

Terms such as "first" and "second" in the specification and the claims of the present disclosure are used to distinguish similar objects and are not necessarily used to describe a specific order or sequence. It should be understood that the terms used in this way may be interchanged under appropriate circumstances, so that the embodiments of the present application described herein may be implemented in a sequence other than those illustrated or described herein. In addition, terms such as "including" and "having" and any variations thereof are intended to cover non-exclusive inclusion. For example, a process, method, system, product or device including a series of steps or units is not limited to the steps or units that are clearly listed and may include other steps or units that are not clearly listed or are inherent to the process, method, product, or device. The term "and/or" used in the specification and the claims indicates involving at least one of connected objects.

Technologies described in this specification are not limited to NR systems and long term evolution (Long Time Evolution, LTE)/LTE-advanced (LTE-Advanced, LTE-A) systems, but may also be applied to various radio communications systems such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-Carrier Frequency-Division Multiple Access, SC-FDMA) and other systems. The terms "system" and "network" are often used interchangeably. The CDMA system may implement radio technologies such as CDMA2000 and universal terrestrial radio access (Universal Terrestrial Radio Access, UTRA). UTRA includes wideband CDMA (Wideband Code Division Multiple Access, WCDMA) and other variants of CDMA. The TDMA system may implement radio technologies such as global system for mobile communication (Global System for Mobile Communication, GSM). The OFDMA system may implement radio technologies such as ultra mobile broadband (Ultra Mobile Broadband, UMB), evolved UTRA (Evolution-UTRA, E-UTRA), IEEE 802.11 (Wi-Fi), IEEE 802.16 (WiMAX), IEEE 1102.20, and Flash-OFDM. UTRA and E-UTRA are parts of a universal mobile telecommunications system (Universal Mobile Telecommunications System, UMTS). LTE and more advanced LTE (such as LTE-A) are new UMTS versions using E-UTRA. UTRA, E-UTRA, UMTS, LTE, LTE-A, and GSM are described in documents from an organization named "3rd Generation Partnership Project" (3rd Generation Partnership Project, 3GPP). CDMA2000 and UMB are described in documents from an organization named "3rd Generation Partnership Project 2" (3GPP2). The technologies described in this specification may be used for the above systems and radio technologies, and may also be used for other systems and radio technologies. However, in the following descriptions, an NR system is described for an illustration purpose and NR terms are used in most of the following descriptions, although these technologies may also be applied to other applications than the NR system application.

Following descriptions are used to provide examples and are not intended to limit the scope, applicability, or configuration described in the claims. Functions and arrangements of discussed elements may be changed without departing from the spirit and scope of the present disclosure. Various examples may be omitted or replaced properly, or various procedures or components may be added. For example, the described method may be performed in an order different from the described order, and steps may be added, omitted, or combined. In addition, features described with reference to some examples may be combined in other examples.

FIG. 1 is taken as an example, and embodiments of the present disclosure may be applied to the application scenario shown in FIG. 1. The terminal may interact with multiple TRPs, and these TRPs may specifically be various base stations/access points. For example, the base station may be a 5G base station or a base station of a later version (for example, a next generation base station (next Generation NodeB, gNB) or a 5G NR NB), or a base station in another communications system (for example, an evolved base station (evolved NodeB, eNB), a WLAN access point, or another access point). The base station may be referred to as a NodeB, an evolved NodeB, an access point, a base transceiver station (Base Transceiver Station, BTS), a radio base station, a radio transceiver, a basic service set (Basic Service Set, BSS), an extended service set (Extended Service Set, ESS), a NodeB, an evolved NodeB (eNB), a home NodeB, a home evolved NodeB, a WLAN access point, a Wi-Fi node, or another appropriate term in the art. As long as the same technical effect is achieved, the base station is not limited to a specific technical term. It should be noted that TRP is only used as an example in the embodiments of the present disclosure, but a specific type of the TRP is not limited.

In an actual transmission, a transmission beam of a TRP has a pattern which includes a main lobe having a certain width and includes multiple side lobes. A network side determines information of angle of departure based on an RSRP reported by a terminal and the pattern of the transmission beam of the TRP. For each transmission beam, the terminal only reports an RSRP of one reception direction, which results in an error in the angle of departure that may be caused due to an error in power measurement, thereby reducing positioning accuracy. In addition, in a case that there is no line of sight (Line Of Sight, LOS) between the transmission beam of the TRP and the reception beam of the terminal, wrong information of the angle of departure may be obtained based on the measured RSRP result.

Embodiments of the present disclosure provide a method of positioning a terminal, which can improve accuracy of a finally obtained terminal position. In the embodiments of the present disclosure, for a transmission beam, the terminal may report measurement results corresponding to more than one reception beam, so as to compensate for the measurement error due to one single measurement result. In addition, as the terminal reports the measurement results corresponding to the multiple reception beams, it is beneficial to increase the quantity of RSRPs obtained through measuring based on LOS lines. Moreover, the terminal may report the LOS information corresponding to the measurement result, so that the network side may give preference to result(s) measured that are based on LOS line(s), which improves accuracy of determining the angle of departure, thereby improving positioning accuracy. Further, the above measurement and reporting process with multiple reception beams may be performed by the terminal for multiple (T) TRPs and for multiple (M) transmission beams.

Figure 2:
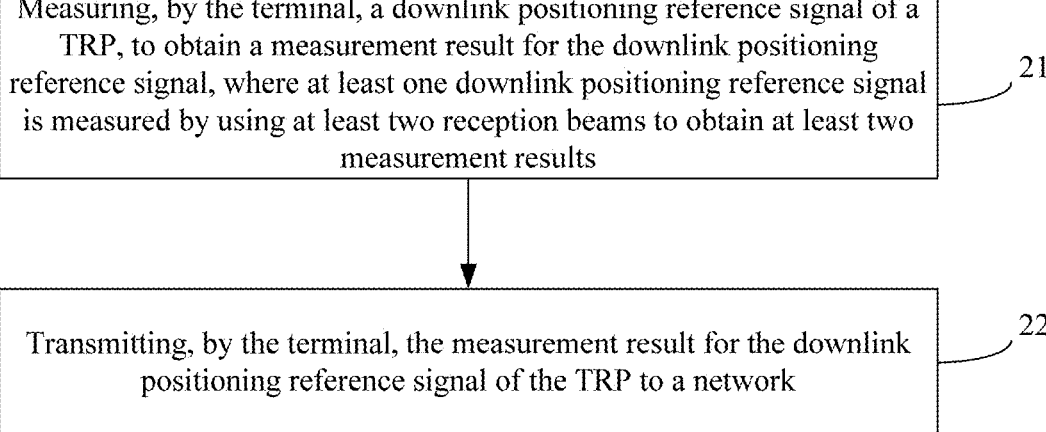
FIG. 2 is a schematic flowchart of a method of positioning a terminal according to embodiments of the present disclosure.

Reference is made to FIG. 2, according to embodiments of the present disclosure, a method of positioning a terminal, when applied to a terminal side, includes the following steps.

Step 21 includes: measuring, by the terminal, a downlink positioning reference signal of a TRP, to obtain a measurement result for the downlink positioning reference signal, where at least one downlink positioning reference signal is measured by using at least two reception beams to obtain at least two measurement results.

The terminal here uses at least two reception beams to perform measurement at least for a certain downlink positioning reference signal of a certain TRP, to obtain at least two measurement results. Each downlink positioning reference signal corresponds to one transmission beam of the TRP.

Step 22 includes: transmitting, by the terminal, the measurement result for the downlink positioning reference signal of the TRP to a network.

The measurement result for the downlink positioning reference signal specifically includes: a received quality measurement value of the downlink positioning reference signal and corresponding reception beam indication information. The received quality measurement value may specifically be an RSRP or other indicators capable of indicating the quality of received signals, such as a reference signal received Quality (Reference Signal Receiving Quality, RSRQ), or a received signal strength indicator (Received Signal Strength Indicator, RSSI). The reception beam indication information may specifically be one or more of the following: a beam index of a reception beam, beam response information of the reception beam, a beam feature of the reception beam, or a beamforming weight of the reception beam. For example, the beam feature of the reception beam may specifically be information such as a beam width or a beam angle. In addition, the phrase "transmitting, by the terminal, . . . to a network" may specifically refer to that "transmitting, by the terminal, . . . to a certain TRP or a base station".

Through the above steps, the terminal may send, to the network side, the measurement results for the downlink positioning reference signal that are obtained through measuring based on at least two reception beams, so that the network side may obtain multiple measurement results for the same one transmission beam. This is favorable for improving accuracy of terminal positioning performed by the network based on these measurement results.

Preferably, in the embodiments of the present disclosure, measurement for each of the downlink positioning reference signals may be performed based on at least two beams, to obtain at least two measurement results and then report the same.

Before the step 21, the terminal may receive positioning measurement configuration information sent by the network, where the positioning measurement configuration information includes configuration information on T TRPs and on multiple downlink positioning reference signals of each TRP. T is a positive integer, which is generally not less than 2. The terminal may determine, based on the positioning measurement configuration information and/or a terminal measurement capability, the quantity of measurement results for each downlink positioning reference signal of each TRP, where different measurement results correspond to different reception beams of the terminal, and at least one downlink positioning reference signal has at least two measurement results.

In addition, the positioning measurement configuration information may also indicate the quantity of measurement results for each of the downlink positioning reference signals, or indicate that the measurement for each of the downlink positioning reference signals is performed based on a maximum quantity of reception beams supported by the terminal. In this case, the terminal may directly determine the quantity of measurement results for each of the downlink positioning reference signals based on the positioning measurement configuration information.

The terminal measurement capability is limited by hardware capability of the terminal and/or parameters of the communications network, etc. Specifically, the terminal measurement capability includes at least one of the following items 1) to 3). That is, the following parameters may be used to describe the measurement capability of the terminal.

1) The terminal supports reporting a maximum of P measurement results for a same downlink positioning reference signal.
   2) The terminal supports reporting a maximum of Q measurement results for multiple downlink positioning reference signals of a same TRP.
   3) The terminal supports reporting a maximum of R measurement results for multiple downlink positioning reference signals of multiple TRPs.

The parameters P, Q and R are positive integers.

The terminal may also send the terminal measurement capability to the network, to assist the network in determining the positioning measurement configuration information for the terminal. That is, before receiving the positioning measurement configuration information sent by the network, the terminal may send the terminal measurement capability to the network.

In some scenarios, the positioning measurement configuration information sent by the network may go beyond the terminal measurement capability, and when the terminal determines the quantity of measurement results for each downlink positioning reference signal of each TRP based on the positioning measurement configuration information and/or terminal measurement capability, the quantity of measurement results for each downlink positioning reference signal of each TRP may be determined in accordance with the following priority order.

1) The quantity of TRPs to be measured has a first priority;
   2) The quantity of downlink positioning reference signals to be measured has a second priority;
   3) The quantity of measurement results for one downlink positioning reference signal at multiple reception beams has a third priority.

Priority is lowered in an order from the first priority, the second priority to the third priority.

In a case that T TRPs (T is the quantity of TRPs) are configured in the positioning measurement configuration information and a total of M downlink positioning reference signals of the T TRPs are to be measured, it is assumed that, with respect to the terminal measurement capability, the terminal supports reporting a maximum of R measurement results for multiple downlink positioning reference signals of multiple TRPs, where R is greater than T and less than M. In this case, a specific implementation manner of determining, based on the above priority order, the quantity of measurement results for each downlink positioning reference signal of each TRP is as follows.

First, an assignment based on the first priority is performed. R measurement results are equally assigned to T TRPs, to obtain the quantity of measurement results assigned for each of T TRPs. If R/T is not an integer, the measurement results corresponding to the remainder may be randomly assigned in the T TRPs. If the quantity of measurement results assigned to a certain TRP through equal assignment exceeds the quantity required by the downlink positioning reference signals configured for that TRP, the excess measurement result(s) may be randomly assigned to other TRP(s) except for that TRP.

Then, an assignment based on the second priority and the third priority is performed. After the quantity of measurement results assigned to each of the TRPs is obtained, and for example, it is assumed for a certain TRP of the multiple TRPs that the quantity S of measurement results assigned to that TRP exceeds the quantity U of downlink positioning reference signals of this TRP, the quantity of measurement results assigned to each downlink positioning reference signal is obtained by equally assigning the S measurement results to the U downlink positioning reference signals. Generally, the quantity of measurement results assigned to each downlink positioning reference signal does not exceed the maximum quantity P of measurement results supported by the terminal for the reporting associating with one downlink positioning reference signal. When configuring the positioning measurement configuration information, the network side needs to consider the measurement capability of the terminal and make an appropriate configuration so as to make full use of the terminal measurement capability, and to ensure that at least two measurement results based on different reception beams can be assigned to at least one downlink positioning reference signal.

Optionally, when the terminal sends the measurement result for the downlink positioning reference signal of the TRP to the network, the measurement result may carry line-of-sight/non-line-of-sight indication information corresponding to the received quality measurement value of the downlink positioning reference signal. The line-of-sight/non-line-of-sight indication information may specifically be one or more of the following: a line of sight, a non-line of sight, a probability for line of sight, a probability for non-line of sight, a probability distribution curve of line of sight, or a probability distribution curve of non-line of sight, to indicate that the received quality measurement value corresponds to the line of sight or the non-line of sight or the indicate the probability for the received quality measurement value being corresponding to the line of sight or the non-line of sight.

Optionally, in order to reduce the transmission resource overhead for transmitting the measurement results for the downlink positioning reference signals of the TRPs by the terminal, the positioning measurement configuration information may be also used to indicate reporting a processing result corresponding to the line of sight only. In this case, in the step 22, the measurement result(s), transmitted by the terminal, for the downlink positioning reference signal(s) of the TRP(s) all correspond to the line of sight.

In determining, by the terminal, (a probability) that a certain measurement result for the downlink positioning reference signal corresponds to the line of sight or the non-line of sight, another line other than a first line is the non-line of sight or the line of sight, or a probability for the other line being the non-line of sight or the line of sight may be determined based on a relationship between a preset threshold and a ratio of a received quality measurement value of the first line to that of the other line. The first line generally refers to a line having an optimal received quality measurement value. Each of the lines corresponds to one reception beam of the terminal.

In addition, in order to assist the network side in configuring the positioning measurement configuration information in an optimized way, the terminal may transmit quantity information of reception beams supported by the terminal to the network. In this way, the network may determine the positioning measurement configuration information based on the quantity information of the reception beams supported by the terminal. For example, in a case that the quantity of reception beams supported by the terminal is relatively large, the quantity of downlink positioning reference signals configured for a certain TRP may be relatively small. Otherwise, in a case that the quantity of reception beams supported by the terminal is relatively small, the quantity of downlink positioning reference signals configured for a certain TRP may be relatively large. That is, in the positioning measurement configuration information, the quantity of downlink positioning reference signals configured for the TRP may be negatively correlated with the quantity of reception beams supported by the terminal, so that a balance between measurement resources and positioning accuracy may be achieved.

FIG. 3 is a flow of a method of positioning a terminal according to embodiments of the present disclosure, which is applied to a network side device. The network side device may be a TRP and/or a positioning server. As shown in FIG. 3, the method includes the following steps.

Step 31 includes: receiving, by a network side device, measurement results for downlink positioning reference signals of multiple transmission and reception points (TRP) transmitted by the terminal, where at least one downlink positioning reference signal of the downlink positioning reference signals has two measurement results corresponding to at least two reception beams of the terminal respectively.

The measurement result(s) for the downlink positioning reference signal(s) here may include: a received quality measurement value of the downlink positioning reference signal and corresponding reception beam indication information. The reception beam indication information may be one or more of the following: a beam index of a reception beam, beam response information of the reception beam, a beam feature of the reception beam, or a beamforming weight of the reception beam. The received quality measurement value may be one or more of: an RSRP, an RSRQ, or an RSRI.

Step 32 includes: performing, by the network side device, terminal positioning based on the measurement results for the downlink positioning reference signals of the multiple TRPs.

Through the above steps, the network side device may obtain at least two measurement results for the same one transmission beam, which is favorable for improving accuracy of terminal positioning performed by the network based on these measurement results.

In the embodiments of the present disclosure, the network side device may transmit positioning measurement configuration information to the terminal, where the positioning measurement configuration information includes configuration information on T TRPs and on multiple downlink positioning reference signals of each TRP.

In addition, the positioning measurement configuration information may also indicate the quantity of measurement results for each of the downlink positioning reference signals, or indicate that measurement for each of the downlink positioning reference signals is performed based on a maximum quantity of reception beams supported by the terminal. In this case, the terminal may directly determine the quantity of measurement results for each of the downlink positioning reference signals based on the positioning measurement configuration information.

Optionally, the network side device may receive quantity information of reception beams supported by the terminal that is sent by the terminal; then the network side device determine the positioning measurement configuration information based on the quantity information of reception beams supported by the terminal. For example, in determining the positioning measurement configuration information, the quantity of downlink positioning reference signals configured for the TRP may be negatively correlated with the quantity of reception beams supported by the terminal, so that a better compromise between measurement resources and positioning accuracy may be achieved.

In the embodiments of the present disclosure, the measurement result(s) for the downlink positioning reference signal(s) may further include: line-of-sight/non-line-of-sight indication information corresponding to the received quality measurement value of the downlink positioning reference signal. Specifically, the line-of-sight/non-line-of-sight indication information is one or more of the following: a line of sight, a non-line of sight, a probability for line of sight, a probability for non-line of sight, a probability distribution curve of line of sight or a probability distribution curve of non-line of sight. In this way, when the network side performs the terminal positioning, the network side may select, for each downlink positioning reference signal based on the line-of-sight/non-line-of-sight indication information corresponding to the received quality measurement value of the downlink positioning reference signal, a measurement result corresponding to the line of sight or a measurement result corresponding to a line having a maximum probability for being the line of sight for performing the terminal positioning, so as to improve calculation precision of the angle of departure and improve accuracy of the terminal positioning.

Optionally, in the above step 32, when the network side device performs the terminal positioning, and in a case that the same one downlink positioning reference signal has multiple measurement results, a first measurement result may be selected from the multiple measurement results based on pieces of line-of-sight/non-line-of-sight indication information corresponding to the received quality measurement values, where the first measurement result has a maximum probability for belonging to the line of sight; and then the terminal positioning is performed based on the first measurement result.

If the measurement result for the downlink positioning reference signal do not carry the line-of-sight/non-line-of-sight indication information, the network side device may determine the first measurement result having the maximum probability for belonging to the line of sight, based on received quality measurement values of the same one downlink positioning reference signal. The first measurement result is generally a measurement result having the best received quality measurement value for the downlink positioning reference signal fed back by the terminal.

It can be seen from the above method that, for a transmission beam (i.e., a downlink positioning reference signal), the terminal in the embodiments of the present disclosure may report measurement results such as RSRPs corresponding to multiple reception beams, so as to compensate for the measurement error in one single measurement result. In addition, by reporting the measurement results corresponding to the multiple reception beams, the quantity of RSRPs obtained through measuring based on LOS lines can be advantageously increased. Moreover, the terminal report pieces of LOS information corresponding to RSRPs, so that the network side may only use RSRP(s) based on LOS line(s), which ensures accuracy of determining the angle of departure and improves positioning accuracy. Further, the above measurement and reporting process with multiple reception beams may be performed by the terminal with respect to multiple (T) TRPs and for multiple (M) transmission beams.

For better understanding of the above embodiments, several specific examples of the present disclosure are provided hereinafter.

Example 1

Each downlink positioning reference signal is a PRS resource.

Each transmission and reception point (TRP) is configured with M=8 PRS resources, and the various PRS resources adopt different beamforming and point to different directions. The positioning server indicates PRS resource configuration information (i.e., positioning measurement configuration information) to the terminal, and also indicates that the value of N is N=8; or indicates the terminal to perform measurement for each PRS resource of each TRP based on a maximum quantity of reception beams allowed by the system (for example, it is defined as 8 for current system) and report corresponding RSRPs.

It is assumed that the terminal supports a maximum of 8 reception beams. The terminal determines a maximum of N=8 RSRPs for each PRS resource of the M=8 PRS resources sent by each TRP. The K-th TRP is taken as an example. For the PRS resource 1 (PRS-1) sent by the K-th TRP, the RSRPs measured by the terminal using the reception beam 1 to the reception beam 8 respectively are expressed as RSRP1, RSRP2, . . . , RSRP8 respectively, and the terminal reports the measured RSRPs and corresponding reception beam indexes RX to the positioning server, which may be expressed in the following form:

```
PRS-1:
{
RSRP1, RX-1;
RSRP2, RX-2;
...
RSRP8, RX-8;
}
```

It is assumed that, after the terminal uses the reception beam 1 to the reception beam 8 to perform measurement for the PRS resource 2 (PRS-2), RSRPs of only reception beams 1 to 4 can be obtained through measurement, while the PRS resource 2 cannot be received with reception beams 5 to 8. Therefore, for the PRS resource 2, the reporting of the terminal is as follows:

```
PRS-2:
{
RSRP1, RX-1;
RSRP2, RX-2;
...
RSRP4, RX-4;
}
```

By analogy, for the K-th TRP, the terminal reports RSRPs and reception beam indications for each of M=8 PRS resources. In the same manner, the terminal reports measurement results for other TRPs.

It is assumed that the positioning server receives measurement results of RSRPs for S=5 TRPs reported by the terminal. For all measurement results obtained by using RX-1, the positioning server may use a relevant algorithm for determining angle of departures, to obtain angles of departure of S=5 TRPs measured with the reception beam 1, and then obtain corresponding position information of RX-1 through an angle calculation algorithm. Similarly, the positioning server may also obtain position information corresponding to each of RX-2 to RX-8. By weighting or screening the 8 pieces of position information, unique terminal position information may be obtained.

Example 2

Each downlink positioning reference signal is a PRS resource.

Each transmission and reception point (TRP) is configured with M=8 PRS resources, and the various PRS resources adopt different beamforming and point to different directions. The terminal indicates, through a capability reporting, that it supports a maximum of 4 reception beam directions. The positioning server indicates PRS resource configuration information (i.e., positioning measurement configuration information) to the terminal, and also indicates that the value of N is N=4. Alternatively, the positioning server indicates the terminal to report RSRPs for each PRS resource of each TRP based on a maximum quantity of reception beams supported by the terminal. In the following, it is assumed that the maximum quantity of reception beams supported by the terminal is 4. Further, the positioning server instructs the terminal to report LOS/non-line-of-sight (Non-line of Sight, NLOS) information of each RSRP.

The terminal determines a maximum of N=4 RSRPs of each PRS resource in the M=8 PRS resources sent by each TRP. The K-th TRP is taken as an example. For the PRS resource 1 sent by the K-th TRP, the RSRPs measured by the terminal using the reception beam 1 to the reception beam 4 respectively are expressed as RSRP1, RSRP2, . . . , RSRP4 respectively. In addition, the terminal determines, based on a maximum arrival time of a line and an arrival time of a first line for the PRS resource 1 measured with the various reception beams, a LOS line probability for a line between each of the reception beams and the PRS resource 1 to be the LOS line. Then, the terminal reports the measured RSRPs and corresponding reception beam indexes RX and LOS line probabilities Plos to the positioning server, which may be shown as follows:

```
PRS-1:
{
RSRP1, RX-1, Plos-1;
RSRP2, RX-2, Plos-2;
...
RSRP4, RX-4, Plos-4;
}
```

For the PRS resource 2, after the terminal uses the reception beam 1 to the reception beam 4 to perform measurement, RSRPs of reception beams 3 to 4 only can be obtained through measurement, while the PRS resource 2 cannot be received with the reception beams 1 and 2. Similarly, the terminal determines the LOS line probabilities for the beam 3 and the beam 4. Therefore, for the PRS resource 2, the reporting of the terminal is as follows:

```
PRS-2:
{
RSRP3, RX-3, Plos-3;
RSRP4, RX-4, Plos-4;
}
```

By analogy, for the K-th TRP, the terminal reports RSRPs, reception beam indications and LOS probabilities, for each of M=8 PRS resources. In the same manner, the terminal reports measurement results for other TRPs.

It is assumed that the positioning server receives measurement results such as RSRPs for S=8 TRPs reported by the terminal. For all measurement results obtained by using RX-1, the positioning service further selects, based on the LOS probabilities, RSRP measurement result(s) having relatively high LOS probability to determine the angle of departure. In this way, the positioning server obtains angles of departure of S=8 TRPs with respect to the reception beam 1, and then obtains corresponding position information of RX-1 through an angle calculation algorithm. Similarly, the positioning server may also obtain position information corresponding to each of RX-2 to RX-4. By weighting or screening the 4 pieces of position information, unique terminal position information may be obtained.

In another implementation, the positioning server may configure the terminal to only report RSRP(s) measured based on the LOS line(s) and corresponding piece(s) of reception beam information. In this case, the terminal does not need to report the LOS probability, and it ensures that the reported RSRP value(s) are all measurement result(s) based on the LOS line(s).

Various methods according to the embodiments of the present disclosure are introduced in the above. Devices capable of implementing the above methods are further provided hereinafter.

Reference is made to FIG. 4. Embodiments of the present disclosure provide a terminal, including:

a measurement unit 41, configured to measure a downlink positioning reference signal of a TRP, to obtain a measurement result for the downlink positioning reference signal, where at least one downlink positioning reference signal is measured by using at least two reception beams to obtain at least two measurement results; and a transmission unit 42, configured to transmit the measurement result for the downlink positioning reference signal of the TRP to a network.

With the above units, the embodiments of the present disclosure may assist the network side in improving accuracy of terminal positioning.

Optionally, the terminal also includes:

a first reception module, configured to: before measuring the downlink positioning reference signal of the TRP, receive positioning measurement configuration information sent by the network, where the positioning measurement configuration information includes configuration information on T TRPs and on multiple downlink positioning reference signals of each TRP; and a determination unit, configured to determine, based on the positioning measurement configuration information and/or a terminal measurement capability, the quantity of measurement results for each downlink positioning reference signal of each TRP, where different measurement results correspond to different reception beams of the terminal, respectively, and at least one downlink positioning reference signal has at least two measurement results.

Optionally, the terminal measurement capability includes at least one of the following:

the terminal supports reporting a maximum of P measurement results for a same downlink positioning reference signal;

the terminal supports reporting a maximum of Q measurement results for multiple downlink positioning reference signals of a same TRP; or, the terminal supports reporting a maximum of R measurement results for multiple downlink positioning reference signals of multiple TRPs.

Optionally, the determination unit is further configured to: in a case that downlink positioning reference signals configured by the positioning measurement configuration information are beyond the terminal measurement capability, determine the quantity of measurement results for each downlink positioning reference signal of each TRP based on the following priority order:

the quantity of TRPs to be measured has a first priority;

the quantity of downlink positioning reference signals to be measured has a second priority; and the quantity of measurement results for one downlink positioning reference signal at multiple reception beams has a third priority.

Optionally, the measurement result for the downlink positioning reference signal includes:

a received quality measurement value of the downlink positioning reference signal and corresponding reception beam indication information.

Optionally, the reception beam indication information includes one or more of the following: a beam index of a reception beam, beam response information of the reception beam, a beam feature of the reception beam, or a beamforming weight of the reception beam.

Optionally, the measurement result for the downlink positioning reference signal further includes:

line-of-sight/non-line-of-sight indication information corresponding to the received quality measurement value of the downlink positioning reference signal.

Optionally, the line-of-sight/non-line-of-sight indication information includes one or more of the following: a line of sight, a non-line of sight, a probability for line of sight, a probability for non-line of sight, a probability distribution curve of line of sight, or a probability distribution curve of non-line of sight.

Optionally, the positioning measurement configuration information is further used to indicate reporting a processing result corresponding to line of sight only; and the measurement result(s) for the downlink positioning reference signal of the TRP, which is transmitted by the transmission unit, corresponds to the line of sight.

Optionally, the transmission unit is further configured to transmit quantity information of reception beams supported by the terminal to the network.

It should be noted that the device in the embodiments corresponds to the device in the method shown in FIG. 2, the implementations in the above embodiments are all applicable to the embodiments of the device, and the same technical effects can be achieved. The above device according to the embodiments of the present disclosure may implement all the method steps realized in the above method embodiments, and the same technical effects can be achieved. Parts of and beneficial effects of the embodiments which are the same as those of the method embodiments are not described in detail in this place.

Figure 5:
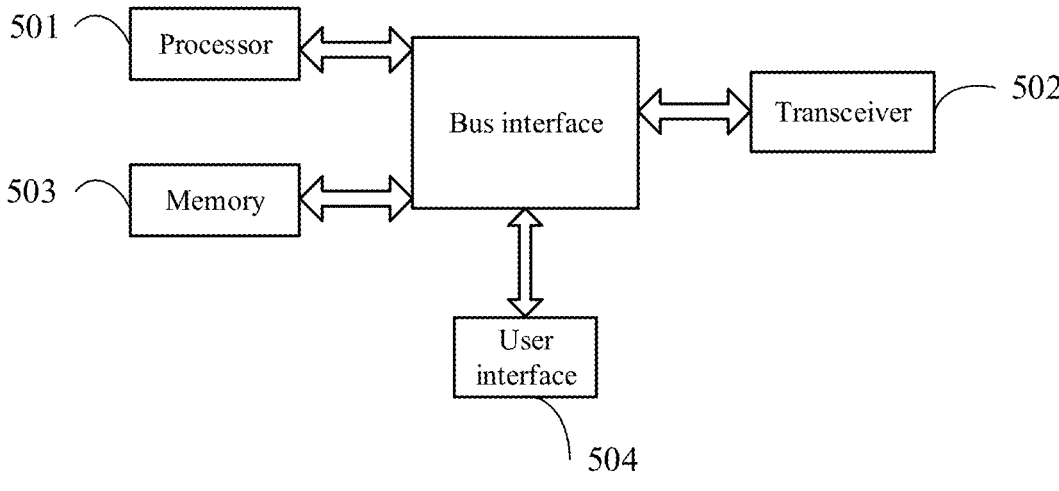
FIG. 5 is another schematic structural diagram of a terminal according to embodiments of the present disclosure.

Reference is made to FIG. 5, which is a schematic structural diagram of a terminal according to embodiments of the present disclosure. The terminal includes: a processor 501, a transceiver 502, a memory 503, a user interface 504 and a bus interface.

In the embodiments of the present disclosure, the terminal further includes: a program stored in the memory 503 and executable on the processor 501.

The transceiver 502 is configured to send and receive data under the control of the processor.

The processor 501 is configured to read the computer program in the memory to perform the following operations:

measuring a downlink positioning reference signal of a transmission and reception point (TRP), to obtain a measurement result for the downlink positioning reference signal, where at least one downlink positioning reference signal is measured by using at least two reception beams to obtain at least two measurement results; and transmitting the measurement result for the downlink positioning reference signal of the TRP to a network.

Optionally, the processor is also configured to read the computer program in the memory to perform the following operations:

before the measuring the downlink positioning reference signal of the TRP, receiving positioning measurement configuration information sent by the network, where the positioning measurement configuration information includes configuration information on T TRPs and on multiple downlink positioning reference signals of each TRP; and determining, based on the positioning measurement configuration information and/or a terminal measurement capability, the quantity of measurement results for each downlink positioning reference signal of each TRP, where different measurement results correspond to different reception beams of the terminal, respectively, and at least one downlink positioning reference signal has at least two measurement results.

Optionally, the terminal measurement capability includes at least one of the following:

the terminal supports reporting a maximum of P measurement results for a same downlink positioning reference signal;

the terminal supports reporting a maximum of Q measurement results for multiple downlink positioning reference signals of a same TRP; or, the terminal supports reporting a maximum of R measurement results for multiple downlink positioning reference signals of multiple TRPs.

Optionally, the processor is also configured to read the computer program in the memory to perform the following operation:

in a case that downlink positioning reference signals configured by the positioning measurement configuration information are beyond the terminal measurement capability, determining the quantity of measurement results for each downlink positioning reference signal of each TRP based on the following priority order:

the quantity of TRPs to be measured has a first priority;

the quantity of downlink positioning reference signals to be measured has a second priority;

the quantity of measurement results for one downlink positioning reference signal at multiple reception beams has a third priority.

Optionally, the measurement result for the downlink positioning reference signal includes:

a received quality measurement value of the downlink positioning reference signal and corresponding reception beam indication information.

Optionally, the reception beam indication information includes one or more of the following: a beam index of a reception beam, beam response information of the reception beam, a beam feature of the reception beam, or a beamforming weight of the reception beam.

Optionally, the measurement result for the downlink positioning reference signal further includes:

line-of-sight/non-line-of-sight indication information corresponding to the received quality measurement value of the downlink positioning reference signal.

Optionally, the line-of-sight/non-line-of-sight indication information includes one or more of the following: a line of sight, a non-line of sight, a probability for line of sight, a probability for non-line of sight, a probability distribution curve of line of sight, or a probability distribution curve of non-line of sight.

Optionally, the positioning measurement configuration information is further used to indicate reporting a processing result corresponding to line of sight only; and the transmitted measurement result(s) for the downlink positioning reference signal of the TRP corresponds to the line of sight.

Optionally, the processor is further configured to read the computer program in the memory to perform the following operation: transmitting quantity information of reception beams supported by the terminal to the network.

It can be understood that, in the embodiments of the present disclosure, the computer program, when executed by the processor 501, may perform the various processes of the above method embodiments shown in FIG. 2, and the same technical effects can be achieved, which are not described in this place to avoid repetition.

In FIG. 5, a bus architecture may include any quantity of interconnected buses and bridges. Various circuits including one or more processors represented by the processor 501 and a memory represented by the memory 503 are linked. The bus architecture may further link various other circuits together, such as a periphery component, a voltage stabilizer and a power management circuit, which are known in the art and are not further described herein. A bus interface provides an interface. The transceiver 502 may be multiple elements, i.e., including a transmitter and a receiver, providing a unit for communicating with various other devices on a transmission medium. For different user equipments, the user interface 504 may be an interface capable of connecting externally and internally with the required equipment. The connected equipment includes but not limited to a keypad, a display, a speaker, a microphone, a joystick, etc.

The processor 501 is in charge of managing the bus architecture and common processes. The memory 503 may store data used by the processor 901 in performing operations.

It should be noted that the device in the embodiments corresponds to the device in the method shown in FIG. 2, the implementations in the above embodiments are all applicable to the embodiments of the device, and the same technical effects can be achieved. In the device, communication connection through the bus interface may be provided between the transceiver 502 and the memory 503, and between the transceiver 502 and the processor 501, the function of the processor 501 may be implemented by the transceiver 502, or, the function of the transceiver 502 may be implemented by the processor 501. It should be noted that the above device according to the embodiments of the present disclosure may implement all the method steps realized in the above method embodiments, and the same technical effects can be achieved. Parts of and beneficial effects of the embodiments which are the same as those of the method embodiments are not described in detail in this place.

Some embodiments of the present disclosure provide a computer readable storage medium, having a program stored thereon, and the program, when being executed by a processor, performs the following steps:

measuring a downlink positioning reference signal of a TRP, to obtain a measurement result for the downlink positioning reference signal, where at least one downlink positioning reference signal is measured by using at least two reception beams to obtain at least two measurement results; and transmitting the measurement result for the downlink positioning reference signal of the TRP to a network.

The program, when being executed by the processor, may realize all the implementations in the above method of positioning the terminal applied to the terminal side, and the same technical effect can be achieved, which are not described in this place to avoid repetition.

Figure 6:
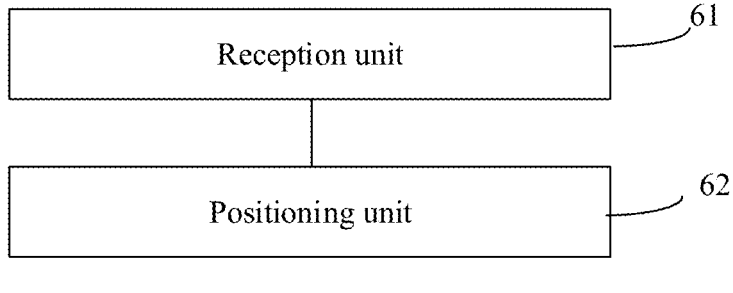
FIG. 6 is a schematic structural diagram of a network side device according to embodiments of the present disclosure.

Embodiments of the present disclosure provide a network side device as shown in FIG. 6, including:

a reception unit 61, configured to receive measurement results for downlink positioning reference signals of multiple TRPs transmitted by a terminal, where at least one downlink positioning reference signal of the downlink positioning reference signals has two measurement results corresponding to at least two reception beams of the terminal respectively; and a positioning unit 62, configured to perform terminal positioning based on the measurement results for the downlink positioning reference signals of the multiple TRPs.

With the above units, the network side device can obtain at least two measurement results for the same one downlink positioning reference signal, which facilitates improving accuracy of the terminal positioning performed by the network based on these measurement results.

Optionally, the network side device further includes:

a transmission unit, configured to transmit positioning measurement configuration information to the terminal, where the positioning measurement configuration information includes configuration information on T TRPs and on multiple downlink positioning reference signals of each TRP.

Optionally, the network side device further includes:

a determination unit, configured to receive quantity information of reception beams supported by the terminal that is sent by the terminal; and determine the positioning measurement configuration information based on the quantity information of reception beams supported by the terminal.

Optionally, the measurement result for the downlink positioning reference signal includes:

a received quality measurement value of the downlink positioning reference signal and corresponding reception beam indication information.

Optionally, the reception beam indication information includes one or more of the following: a beam index of a reception beam, beam response information of the reception beam, a beam feature of the reception beam, or a beamforming weight of the reception beam.

Optionally, the measurement result for the downlink positioning reference signal further includes:

line-of-sight/non-line-of-sight indication information corresponding to the received quality measurement value of the downlink positioning reference signal.

Optionally, the line-of-sight/non-line-of-sight indication information includes one or more of the following: a line of sight, a non-line of sight, a probability for line of sight, a probability for non-line of sight, a probability distribution curve of line of sight, or a probability distribution curve of non-line of sight.

Optionally, the positioning unit is further configured to: in a case that a same downlink positioning reference signal has multiple measurement results, select a first measurement result from the multiple measurement results, where the first measurement result has a maximum probability for belonging to a line of sight; and perform the terminal positioning based on the first measurement result.

It should be noted that the device in the embodiments corresponds to the device in the method shown in FIG. 3, the implementations in the above embodiments are all applicable to the embodiments of the device, and the same technical effects can be achieved. It should be noted that the above device according to the embodiments of the present disclosure may implement all the method steps realized in the above method embodiments, and the same technical effects can be achieved. Parts of and beneficial effects of the embodiments which are the same as those of the method embodiments are not described in detail in this place.

Figure 7:
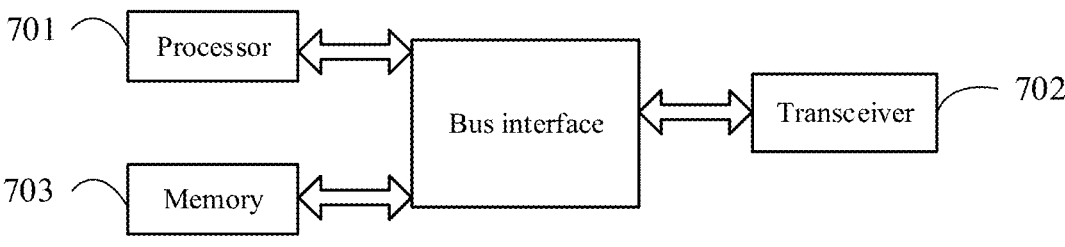
FIG. 7 is another schematic structural diagram of a network side device according to embodiments of the present disclosure.

Reference is made to FIG. 7, which a schematic structural diagram of a network side device according to embodiments of the present disclosure, including: a processor 701, a transceiver 702, a memory 703, and a bus interface.

In the embodiments of the present disclosure, the network side device further includes: a program stored in the memory 703 and executable on the processor 701.

The transceiver 502 is configured to send and receive data under the control of the processor.

The processor 501 is configured to read the computer program in the memory to perform the following operations:

receiving measurement results for downlink positioning reference signals of multiple TRPs transmitted by the terminal, where at least one downlink positioning reference signal of the downlink positioning reference signals has two measurement results corresponding to at least two reception beams of the terminal respectively; and performing terminal positioning based on the measurement results for the downlink positioning reference signals of the multiple TRPs.

Optionally, the processor is also configured to read the computer program in the memory to perform the following operation:

transmitting positioning measurement configuration information to the terminal, where the positioning measurement configuration information includes configuration information on T TRPs and on multiple downlink positioning reference signals of each TRP.

Optionally, the processor is also configured to read the computer program in the memory to perform the following operations:

receiving quantity information of reception beams supported by the terminal that is sent by the terminal; and determining the positioning measurement configuration information based on the quantity information of reception beams supported by the terminal.

Optionally, the measurement result for the downlink positioning reference signal includes:

a received quality measurement value of the downlink positioning reference signal and corresponding reception beam indication information.

Optionally, the reception beam indication information includes one or more of the following: a beam index of a reception beam, beam response information of the reception beam, a beam feature of the reception beam, or a beamforming weight of the reception beam.

Optionally, the measurement result for the downlink positioning reference signal further includes:

line-of-sight/non-line-of-sight indication information corresponding to the received quality measurement value of the downlink positioning reference signal.

Optionally, the line-of-sight/non-line-of-sight indication information includes one or more of the following: a line of sight, a non-line of sight, a probability for line of sight, a probability for non-line of sight, a probability distribution curve of line of sight, or a probability distribution curve of non-line of sight.

Optionally, the processor is also configured to read the computer program in the memory to perform the following operations:

in a case that a same downlink positioning reference signal has multiple measurement results, selecting a first measurement result from the multiple measurement results, where the first measurement result has a maximum probability for belonging to a line of sight; and performing the terminal positioning based on the first measurement result.

It can be understood that, in the embodiments of the present disclosure, the computer program, when executed by the processor 701, may perform the various processes of the above method embodiments shown in FIG. 3, and the same technical effects can be achieved, which are not described in this place to avoid repetition.

In FIG. 7, a bus architecture may include any quantity of interconnected buses and bridges. Various circuits including one or more processors represented by the processor 701 and a memory represented by the memory 703 are linked. The bus architecture may further link various other circuits together, such as a periphery component, a voltage stabilizer and a power management circuit, which are known in the art and are not further described herein. A bus interface provides an interface. The transceiver 702 may be multiple elements, i.e., including a transmitter and a receiver, providing a unit for communicating with various other devices on a transmission medium.

The processor 701 is in charge of managing the bus architecture and common processes. The memory 7903 may store data used by the processor 701 in performing operations.

It should be noted that the device in the embodiments corresponds to the device in the method shown in FIG. 3, the implementations in the above embodiments are all applicable to the embodiments of the device, and the same technical effects can be achieved. In the device, communication connection through the bus interface may be provided between the transceiver 702 and the memory 703, and between the transceiver 702 and the processor 701, the function of the processor 701 may be implemented by the transceiver 702, or, the function of the transceiver 702 may be implemented by the processor 701. It should be noted that the above device according to the embodiments of the present disclosure may implement all the method steps realized in the above method embodiments, and the same technical effects can be achieved. Parts of and beneficial effects of the embodiments which are the same as those of the method embodiments are not described in detail in this place.

Some embodiments of the present disclosure also provide a computer readable storage medium, having a program stored thereon, and the program, when being executed by a processor, performs the following steps:

receiving measurement results for downlink positioning reference signals of multiple TRPs transmitted by the terminal, where at least one downlink positioning reference signal of the downlink positioning reference signals has two measurement results corresponding to at least two reception beams of the terminal respectively; and performing terminal positioning based on the measurement results for the downlink positioning reference signals of the multiple TRPs.

The program, when executed by the processor, may realize all the implementations in the above method of positioning the terminal applied to the network side device, and the same technical effect can be achieved, which are not described in this place to avoid repetition.

Those skilled in the art will appreciate that the units and the algorithm steps described in conjunction with the embodiments according to the present disclosure may be implemented in the form of electronic hardware or a combination of computer software and electronic hardware. Whether these functions are performed in hardware or in software depends on the specific application and design constraints of the technical solution. Those skilled in the art may use different methods to implement the described functions for each particular application, and such implementations are not to be considered as departing from the scope of the present disclosure.

Those skilled in the art can clearly understand that, for the sake of easiness and conciseness of description, reference can be made to the corresponding processes in the foregoing method embodiments for specific operating processes of the systems, the devices and the units described above, and a repeated description thereof is omitted herein.

It should be understood that in the embodiments according to the present disclosure, the disclosed device and method may be implemented in other ways. For example, the described embodiments directed to the device are merely exemplary. For example, the units are divided merely in logical function, which may be divided in another way in actual implementation, e.g., multiple units or components may be combined or integrated into another device, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

The units described as separate components may or may not be physically separated, and the components shown as units may or may not be physical units, that is, they may be located in one place or distributed over multiple network units. Some or all of the units may be selected according to practical needs to achieve the object of the technical solutions of the embodiments of the present disclosure.

In addition, functional units in various embodiments of the present disclosure may be integrated into one processing unit, or may be physically independent, or two or more units may be integrated into one unit.

If the function is implemented in the form of a software functional unit, and sold or used as a standalone product, it may be stored in a computer readable storage medium. Based on this understanding, essence of the technical solution of the present disclosure, or the part contributing to the related technologies, or part of the technical solution, may be embodied in the form of a software product. The computer software product is stored in a storage medium, and the software product includes a number of instructions to enable a computer device (which may be a personal computer, a server, or a network device, etc.) to perform all or part of the steps of method described in the various embodiments of the present disclosure. The storage medium includes a USB flash disk, a mobile hard disk, a read-only memory (Read-Only Memory, ROM), a random access memory (Random Access Memory, RAM), a magnetic disk, an optical disk, and other medium which can store program code.

It should be noted and understood that the division of the above modules is only a division of logical functions, which may be fully or partially integrated into a physical entity or physically separated in actual implementations. These modules may all be implemented in the form of software called by processing elements; or may all be implemented in the form of hardware; or, some modules may be implemented in the form of software called by processing elements, and some modules may be implemented in the form of hardware. For example, the determination module may be a separate processing element, or may be integrated into a certain chip of the above device, or, may be stored in the memory of the above—device in the form of program code, and a certain processing element of the above device may call and execute the functions of the determination. Other modules have similar implementations. In addition, all or part of these modules may be integrated together, and may be implemented independently. The processing element mentioned here may be an integrated circuit with signal processing capability. In the implementation process, the various steps of the above method or the above various modules may be implemented by an integrated logic circuit in hardware form in elements of a processor or instructions in the form of software.

For example, the various modules, units, subunits or submodules may be one or more integrated circuits configured to implement the above methods, such as one or more application specific integrated circuits (Application Specific Integrated Circuit, ASIC), or one or more microprocessors (Digital Signal Processor, DSP), or one or more field programmable gate arrays (Field Programmable Gate Array, FPGA), etc. As another example, when a module described above is implemented in the form of scheduling program codes by a processing element, the processing element may be a general purpose processor, such as a central processing unit (Central Processing Unit, CPU) or other processors that may call program codes. As another example, these modules may be integrated together and implemented as a system-on-a-chip (system-on-a-chip, SOC).

Terms such as "first" and "second" in the specification and the claims of the present disclosure are used to distinguish similar objects and are not necessarily used to describe a specific order or sequence. It should be understood that the terms used in this way may be interchanged under appropriate circumstances, so that the embodiments of the present application described herein may be implemented in a sequence other than those illustrated or described herein. In addition, terms such as "including" and "having" and any variations thereof are intended to cover non-exclusive inclusion. For example, a process, method, system, product or device including a series of steps or units is not limited to the steps or units that are clearly listed and may include other steps or units that are not clearly listed or are inherent to the process, method, product, or device. Moreover, the term "and/or" used in the specification and the claims indicates involving at least one of connected objects, for example, A and/or B and/or C means 7 situations including: A alone, B alone, C alone, both A and B, both B and C, both A and C, and all of A, B and C. Similarly, the use of "at least one of A and B" in this specification and claims should be understood as "A alone, B alone, or both A and B".

The above descriptions merely illustrate specific implementations of the present disclosure, and the protection scope of the present disclosure is not limited thereto. Any modification or substitution made by those skilled in the art without departing from the technical scope of the present disclosure shall fall within the protection scope of the present disclosure. Therefore, the protection scope of present disclosure is determined by the protection scope of the claims.

What is claimed is:

1. A method of positioning a terminal, comprising:

measuring, by the terminal, a downlink positioning reference signal of a transmission and reception point (TRP), to obtain a measurement result for the downlink positioning reference signal, wherein at least one downlink positioning reference signal is measured by using at least two reception beams to obtain at least two measurement results; and transmitting, by the terminal, the measurement result for the downlink positioning reference signal of the TRP to a network;

wherein before the measuring the downlink positioning reference signal of the TRP the method further comprises:

receiving, by the terminal, positioning measurement configuration information sent by the network, wherein the positioning measurement configuration information comprises configuration information on T TRPs and on a plurality of downlink positioning reference signals of each TRP; and determining, by the terminal based on the positioning measurement configuration information and/or a terminal measurement capability, the quantity of measurement results for each downlink positioning reference signal of each TRP, wherein different measurement results correspond to different reception beams of the terminal, respectively, and at least one downlink positioning reference signal has at least two measurement results;

wherein the terminal measurement capability comprises at least one of the following:

the terminal supports reporting a maximum of P measurement results for a same downlink positioning reference signal;

the terminal supports reporting a maximum of Q measurement results for a plurality of downlink positioning reference signals of a same TRP; or, the terminal supports reporting a maximum of R measurement results for a plurality of downlink positioning reference signals of a plurality of TRPs;

wherein the determining, by the terminal based on the positioning measurement configuration information and/or the terminal measurement capability, the quantity of measurement results for the each downlink positioning reference signal of the each TRP comprises:

in a case that downlink positioning reference signals configured by the positioning measurement configuration information are beyond the terminal measurement capability, determining, by the terminal, the quantity of measurement results for each downlink positioning reference signal of each TRP based on the following items with a priority order in the sequence listed:

the quantity of TRPs to be measured; the quantity of downlink positioning reference signals to be measured; the quantity of measurement results for one downlink positioning reference signal at a plurality of reception beams.

2. The method according to claim 1, wherein the measurement result for the downlink positioning reference signal comprises: a received quality measurement value of the downlink positioning reference signal and corresponding reception beam indication information; wherein the reception beam indication information comprises one or more of the following: a beam index of a reception beam, beam response information of the reception beam, a beam feature of the reception beam, or a beamforming weight of the reception beam.

3. The method according to claim 2, wherein the measurement result for the downlink positioning reference signal further comprises:

line-of-sight/non-line-of-sight indication information corresponding to the received quality measurement value of the downlink positioning reference signal;

wherein the line-of-sight/non-line-of-sight indication information comprises one or more of the following: a line of sight, a non-line of sight, a probability for line of sight, a probability for non-line of sight, a probability distribution curve for line of sight, or a probability distribution curve for non-line of sight.

4. The method according to claim 1, wherein the positioning measurement configuration information is further used to indicate reporting a processing result corresponding to line of sight only; and the measurement result for the downlink positioning reference signal of the TRP, which is transmitted by the terminal, correspond to the line of sight.

5. The method according to claim 1, further comprising:

transmitting, by the terminal, quantity information of reception beams supported by the terminal to the network.

6. A method of positioning a terminal, comprising:

transmitting, by a network side device, positioning measurement configuration information to the terminal, wherein the positioning measurement configuration information comprises configuration information on T transmission and reception points (TRPs) and on a plurality of downlink positioning reference signals of each TRP;

receiving, by a network side device, measurement results for downlink positioning reference signals of a plurality of TRPs transmitted by the terminal, wherein the quantity of measurement results for each downlink positioning reference signal of each TRP is determined based on the positioning measurement configuration information and/or a terminal measurement capability, different measurement results correspond to different reception beams of the terminal, respectively, and at least one downlink positioning reference signal has two measurement results corresponding to at least two reception beams of the terminal respectively; and performing, by the network side device, terminal positioning based on the measurement results for the downlink positioning reference signals of the plurality of TRPs;

wherein the terminal measurement capability comprises at least one of the following:

the terminal supports reporting a maximum of P measurement results for a same downlink positioning reference signal;

the terminal supports reporting a maximum of Q measurement results for a plurality of downlink positioning reference signals of a same TRP; or, the terminal supports reporting a maximum of R measurement results for a plurality of downlink positioning reference signals of a plurality of TRPs;

wherein the determining, by the terminal based on the positioning measurement configuration information and/or the terminal measurement capability, the quantity of measurement results for the each downlink positioning reference signal of the each TRP comprises:

in a case that downlink positioning reference signals configured by the positioning measurement configuration information are beyond the terminal measurement capability, determining, by the terminal, the quantity of measurement results for each downlink positioning reference signal of each TRP based on the following items with a priority order in the sequence listed:

the quantity of TRPs to be measured; the quantity of downlink positioning reference signals to be measured; the quantity of measurement results for one downlink positioning reference signal at a plurality of reception beams.

7. The method according to claim 6, further comprising:

receiving, by the network side device, quantity information of reception beams supported by the terminal that is sent by the terminal; and determining, by the network side device, the positioning measurement configuration information based on the quantity information of reception beams supported by the terminal.

8. The method according to claim 6, wherein the measurement result for the downlink positioning reference signal comprises:

a received quality measurement value of the downlink positioning reference signal and corresponding reception beam indication information;

wherein the reception beam indication information comprises one or more of the following: a beam index of a reception beam, beam response information of the reception beam, a beam feature of the reception beam, or a beamforming weight of the reception beam.

9. The method according to claim 8, wherein the measurement result for the downlink positioning reference signal further comprises:

line-of-sight/non-line-of-sight indication information corresponding to the received quality measurement value of the downlink positioning reference signal; wherein the line-of-sight/non-line-of-sight indication information comprises one or more of the following:

a line of sight, a non-line of sight, a probability for line of sight, a probability for non-line of sight, a probability distribution curve of line of sight, or a probability distribution curve of non-line of sight.

10. The method according to claim 6, wherein the performing terminal positioning based on the measurement results for the downlink positioning reference signals of the plurality of TRPs comprises:

in a case that a same downlink positioning reference signal comprises a plurality of measurement results, selecting, by the network side device, a first measurement result from the plurality of measurement results, wherein the first measurement result has a maximum probability for belonging to a line of sight; and performing, by the network side device, the terminal positioning based on the first measurement result.

11. A network side device, comprising a memory, a transceiver and a processor, wherein the memory is configured to store a computer program;

the transceiver is configured to send and receive data under control of the processor; and the processor is configured to read the computer program in the memory to perform the method according to claim 6.

12. The network side device according to claim 11, wherein the measurement result for the downlink positioning reference signal comprises:

a received quality measurement value of the downlink positioning reference signal and corresponding reception beam indication information;

wherein the reception beam indication information comprises one or more of the following: a beam index of a reception beam, beam response information of the reception beam, a beam feature of the reception beam, or a beamforming weight of the reception beam.

13. The network side device according to claim 11, wherein the performing terminal positioning based on the measurement results for the downlink positioning reference signals of the plurality of TRPs comprises:

in a case that a same downlink positioning reference signal comprises a plurality of measurement results, selecting, by the network side device, a first measurement result from the plurality of measurement results, wherein the first measurement result has a maximum probability for belonging to a line of sight; and performing, by the network side device, the terminal positioning based on the first measurement result.

14. A terminal, comprising a memory, a transceiver and a processor, wherein, the memory is configured to store a computer program;

the transceiver is configured to send and receive data under control of the processor; and the processor is configured to read the computer program in the memory to perform following operations:

measuring a downlink positioning reference signal of a transmission and reception point (TRP), to obtain a measurement result for the downlink positioning reference signal, wherein at least one downlink positioning reference signal is measured by using at least two reception beams to obtain at least two measurement results; and transmitting the measurement result for the downlink positioning reference signal of the TRP to a network;

before the measuring the downlink positioning reference signal of the TRP the operations further comprise:

receiving positioning measurement configuration information sent by the network, wherein the positioning measurement configuration information comprises configuration information on T TRPs and on a plurality of downlink positioning reference signals of each TRP; and determining, based on the positioning measurement configuration information and/or a terminal measurement capability, the quantity of measurement results for each downlink positioning reference signal of each TRP, wherein different measurement results correspond to different reception beams of the terminal, respectively, and at least one downlink positioning reference signal has at least two measurement results;

wherein the terminal measurement capability comprises at least one of the following:

the terminal supports reporting a maximum of P measurement results for a same downlink positioning reference signal;

the terminal supports reporting a maximum of Q measurement results for a plurality of downlink positioning reference signals of a same TRP; or, the terminal supports reporting a maximum of R measurement results for a plurality of downlink positioning reference signals of a plurality of TRPs;

wherein the determining, by the terminal based on the positioning measurement configuration information and/or the terminal measurement capability, the quantity of measurement results for the each downlink positioning reference signal of the each TRP comprises:

in a case that downlink positioning reference signals configured by the positioning measurement configuration information are beyond the terminal measurement capability, determining, by the terminal, the quantity of measurement results for each downlink positioning reference signal of each TRP based on the following items with a priority order in the sequence listed:

the quantity of TRPs to be measured; the quantity of downlink positioning reference signals to be measured; the quantity of measurement results for one downlink positioning reference signal at a plurality of reception beams.

15. The terminal according to claim 14, wherein the measurement result for the downlink positioning reference signal comprises: a received quality measurement value of the downlink positioning reference signal and corresponding reception beam indication information;

wherein the reception beam indication information comprises one or more of the following: a beam index of a reception beam, beam response information of the reception beam, a beam feature of the reception beam, or a beamforming weight of the reception beam.

16. The terminal according to claim 15, wherein the measurement result for the downlink positioning reference signal further comprises:

line-of-sight/non-line-of-sight indication information corresponding to the received quality measurement value of the downlink positioning reference signal;

wherein the line-of-sight/non-line-of-sight indication information comprises one or more of the following: a line of sight, a non-line of sight, a probability for line of sight, a probability for non-line of sight, a probability distribution curve for line of sight, or a probability distribution curve for non-line of sight.

* * * * *